3,234,231
OXADIAZOLYL-THIOPHENE COMPOUNDS
Adolf Emil Siegrist, Basel, Erwin Maeder, Aesch, Basel-Land, Leonardo Guglielmetti, Basel, and Peter Liechti, Binningen, Basel-Land, Switzerland, assignors to Ciba Limited, Basel, Switzerland, a company of Switzerland
No Drawing. Filed Nov. 27, 1963, Ser. No. 326,369
Claims priority, application Switzerland, Nov. 30, 1962, 14,107/62
5 Claims. (Cl. 260—307)

The present invention provides new, valuable oxadiazolyl-thiophene compounds of the general formula (1) 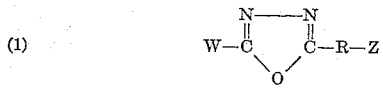

where W represents an alkoxybenzene, biphenylyl or naphthalene radical, R a thiophene radical bound in position 2 to Z and in position 5 to the 1:3:4-oxadiazole ring, and Z represents a possibly functionally converted carboxyl group.

In the Formula 1 Z may stand for a free or neutralized carboxyl group of the formula —COO cation (for example an ammonium, alkali metal, alkaline earth metal or amine salt) or for a functionally converted carboxyl group. Suitable functionally converted carboxyl groups are, for example, carboxylic acid halide groups such as the carboxylic acid chloride group, or carboxylic acid ester groups such as carboxylic acid alkenyl ester groups, carboxylic acid aryl ester groups, carboxylic acid aralkyl ester groups or especially carboxylic acid alkyl ester groups, or the carboxylic acid nitrile group, carboxylic acid amine groups (—CONH₂ and amide groups carrying an organic substituent on the nitrogen atom) and above all carboxylic acid hydrazide groups (—CONH—NH₂ and hydrazide groups carrying an organic substituent on the nitrogen atom).

From among the new oxadiazolyl-thiophene compounds of the general Formula 1 there may be especially mentioned, for example, those of the formula (2) 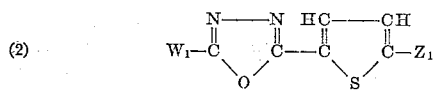

in which $W_1$ stands for alkoxyphenyl, biphenylyl, naphthyl or alkoxynaphthyl and $Z_1$ for a carboxylic acid group (—CO—OH), a carboxylic acid-($C_1$-$C_4$)alkyl ester group, especially a carboxylic acid methyl ester group (—COOCH₃) or a carboxylic acid hydrazide group (—CO—NH—NH₂). Preferred alkoxy groups are those of low molecular weight containing up to 4 carbon atoms.

The new oxadiazolyl-thiophene compounds of the general Formula 1 can be manufactured, for example, by reacting a thiophene-monocarboxylic acid halide, especially a thiophene-monocarboxylic acid chloride of the formula (3) 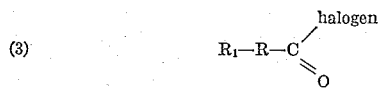

—in which $R_1$ represents a lower carboxylic acid alkyl ester group, especially a carboxylic acid methyl ester group, and R represents a thiophene radical bound in position 2 with the carboxylic acid halide group and in position 5 with $R_1$—in the presence of an organic solvent with a monoacylhydrazine of the formula (4) 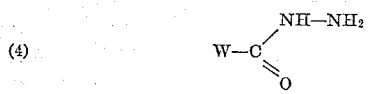

and treating the resulting diacylhydrazine of the formula (5) 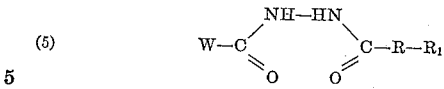

with a water-eliminating agent, if desired after having first been isolated, and if desired in the oxadiazolyl-thiophene compound the lower carboxylic acid alkyl ester group, more especially a carboxylic acid methyl ester group, bound with the thiophene radical is hydrolyzed to form the carboxyl group or is converted into another carboxylic acid ester group or into another functionally modified carboxyl group. This can be achieved, for example, by first reacting the thiophene-monocarboxylic acid halide, more especially a thiophene-monocarboxylic acid chloride, of the Formula 3 in the presence of an inert organic solvent (such as toluene, a xylene, orthodichlorobenzene or especially chlorobenzene) at a temperature ranging from about 100 to 200° C. with a monoacylhydrazine of the Formula 4, whereupon the resulting diacylhydrazine of the Formula 5, without being intermediately isolated, is treated with a water-eliminating agent, more especially one that does not sulfonate; alternatively, the thiophene-monocarboxylic acid halide, more especially a thiophene-monocarboxylic acid chloride, of the Formula 3 is first reacted with a monoacylhydrazine of the Formula 4 in the presence of a pyridine base such as a picoline or especially pyridine, which at the same time acts as solvent and as acid acceptor, whereupon the resulting diacylhydrazine of the Formula 5 is isolated and then treated with a water-eliminating agent, more especially one that does not sulfonate.

Especially suitable water-eliminating agents are those which do not sulfonate, such as anhydrous zinc chloride, aluminium chloride, phosgene, phosphorus trichloride, pentachloride or oxychloride and especially thionyl chloride. The ring-closure is performed, for example, by heating the diacylhydrazine with the water-eliminating agent in an inert organic solvent. When thionyl chloride is used as water-eliminating agent, the inert organic solvent may be replaced by an excess of thionyl chloride and after the reaction the excess thionyl chloride may be distilled off, if desired under reduced pressure.

The thiophene-monocarboxylic acid halides of the Formula 3 to be used as starting materials in the process described above are known or, insofar as they are new, they can be manufactured by known methods, for example by reaction of thionyl chloride upon the monoethyl ester or especially monomethyl ester of, for example, thiophene-2:5-dicarboxylic acid, 3:4-dimethyl-thiophene-2:5-dicarboxylic acid or 3:4-diphenyl-thiophene-2:5-dicarboxylic acid. A particularly suitable thiophene-monocarboxylic acid halide of the Formula 3 is, for example, the known acid chloride of the formula (6) 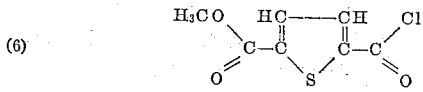

The monoacylhydrazines of the Formula 4 to be used as further starting materials in the process described above are likewise known or, if new, they can be manufactured by known methods, for example by monoacylating hydrazine with a functional derivative of a carboxylic acid, such as the anhydrides, acid chlorides and above all esters thereof. Especially suitable monoacylhydrazines are, for example, those of the formulae (7) 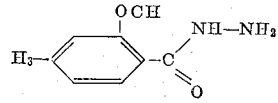

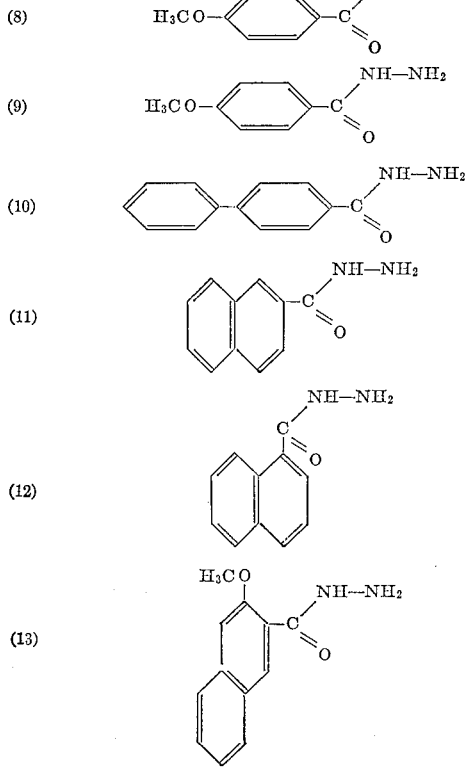

As mentioned above, the lower carboxylic acid alkyl ester group, more especially a carboxylic acid methyl ester group (cf. $R_1$ in Formula 3), bound to the thiophene residue in the oxadiazole compound, may be hydrolysed to the carboxyl group, or converted into another carboxylic acid ester group or another functionally modified carboxyl group.

The hydrolysis of the lower carboxylic acid alkyl ester group to the carboxyl group and the conversion of this ester group into another carboxylic ester group or into another functionally modified carboxyl group follow the usual practice. Thus, for example, the carboxyl group can be esterified with an organic hydroxy compound, more especially with a primary aliphatic or araliphatic alcohol or with a phenol or naphthol; alternatively, the carboxyl group can be converted, for example with thionyl chloride, into a carboxylic acid chloride group which latter can then be reacted in known manner with ammonia or with a primary or secondary amine or with hydrazine or a substituted hydrazine to form a carboxylic acid amide or hydrazide group. The conversion of the free carboxyl group into a neutralized carboxyl group (for example an ammonium, alkali metal, alkaline earth metal or amine salt) likewise follows the usual practice.

Alternatively, the oxadiazolyl-thiophene compounds of the Formula 1 can be obtained by reacting a thiophene-monocarboxylic acid hydrazide of the formula

(14) 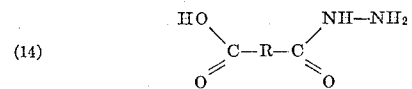

—in which R represents a thiophene radical bound in position 2 with the carboxylic acid hydrazide group and in position 5 with the carboxyl group—in the presence of an organic solvent with a monocarboxylic acid halide of the formula

(15) 

more especially with a monocarboxylic acid chloride, treating the resulting diacylhydrazine of the formula

(16) 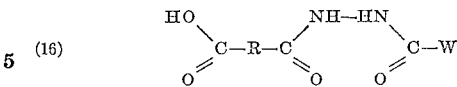

—if desired after first having isolated it—with a water-eliminating agent. When thionyl chloride is used as water-eliminating agent, the reaction may be performed so that simultaneously with the ring closure the carboxyl group bound in position 5 with the thiophene radical is converted into a carboxyl acid chloride group which, if desired, may then be hydrolized to the carboxyl group or converted into another functionally modified carboxyl group.

According to another process for the manufacture of oxadiazolyl-thiophene compound of the general Formula 1 a chloromethyl group is introduced into the 2-position of the thiophene ring of a thiophene compound of the general formula

(17) 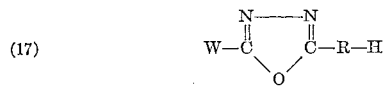

—in which W has the same meaning as in Formula 1, R represents a thiophene radical bound in position 2 with H and in position 5 with the oxadiazole ring—by reaction with hydrogen chloride and formaldehyde or paraformaldehyde or with dichloromethyl ether, whereupon in the resulting chloromethylated compound of the formula

(18) 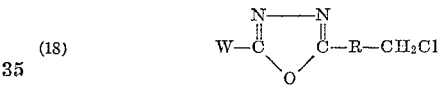

the chloromethyl group is hydrolyzed to the hydroxymethyl group, the latter is oxidized to the carboxyl group and, if desired, this carboxyl group is esterified or converted into another functionally modified carboxyl group.

The oxadiazolyl-thiophene compounds of the general Formula 1 obtained according to this invention are valuable, new products which are suitable, for example, as intermediates for the manufacture of dyestuffs and of optical brighteners, as filters against ultraviolet rays, as scintillators, for various photographic purposes such as electrophotographic reproduction or for super-sensitising photographic materials.

The new oxadiazolyl-thiophene compounds of the general Formula 1 obtained by the present process are, above all, optical brighteners suitable for optically brightening a wide variety of organic materials.

The application of the new brighteners may consist in impregnating the material to be brightened at an elevated temperature ranging for example, from 50 to 100° C., with a solution, preferably an aqueous solution, or a dispersion of the compound, whereupon the impregnated material is centrifuged or squeezed and then dried. Apart from the said aqueous solutions there may also be used for the improvement according to the invention solutions in organic solvents. It is also possible to treat the material with the new compounds in a dispersed form, for example, with dispersions prepared with dispersing agents such as soaps, soap-like substances, polyglycol ethers of fatty alcohols, sulphite cellulose waste liquor or with formaldehyde condensation products of possibly alkylated naphthalenesulfonic acids.

Furthermore, the new oxadiazolyl-thiophene compounds can also be added to or incorporated with the organic material before or during its shaping. Inter alia, they may be added to the moulding compositions from which films, foils, tapes or mouldings are made or they may be added to the moulding compositions from which films, foils, tapes or mouldings are made or they may be dissolved or finely dispersed in the spinning mass before the latter is spun. The new oxadiazolyl-thiophene compounds of the composition defined above may also be added to the reaction mixtures before or during the polycondensation leading, for example, to polyesters or polyamides, or before or during the polymerisation of monomers, for example acrylonitrile or vinyl chloride.

The requisite amount of the new oxadiazolylthiophene compound, referred to the weight of the material to be optically brightened, may vary within wide limits. Even a very small amount, in some cases, for example, as little as 0.01%, may produce a distinct and durable brightening effect. While an amount of more than 3% may in general not prove harmful, it does not offer any advantage over the normal amount either.

The new oxadiazolyl-thiophene compounds may be used as optical brighteners in the following ways:

(a) In admixture with dyestuffs or as additives to dyebaths, printing, discharge or reserve printing pastes. Also for after-treating dyeings, prints or discharge prints.

(b) In admixture with chemical bleaches or as additives to bleaching baths.

(c) In admixture with dressing agents, such as starch or synthetic dressing agents. The compound of the invention may be added, for example, to a liquor used for producing an anti-crease effect.

(d) In conjunction with detergents. The detergent and the brightener may be added separately to the washing liquor. It is also of advantage to use a detergent of which one ingredient is the brightener. Suitable detergents are, for example, soaps, salts of sulfonate detergents, for example of sulfonated benzimidazoles substituted on the carbon atom 2 by higher alkyl radicals; furthermore salts of monocarboxylic acid esters of 4-sulfophthalic acid with higher fatty alcohols; also salts of fatty alcohol sulfonates, alkylarylsulfonic acids or condensation products of higher fatty acid with aliphatic hydroxysulfonic or aminosulfonic acids. Furthermore, there may be used non-ionic detergents, for example polyglycol ethers derived from ethylene oxide and higher fatty alcohols, alkylphenols or fatty amines.

The detergents of the kind referred to above may also contain the usual additives to detergents such as alkali metal carbonates, phosphates, pyrophosphates, polyphosphates, metaphosphates, silicates, perborates or percarbonates, provided the brightening agent is compatible with such additives. It is also possible to manufacture detergents consisting exclusively or predominantly of inorganic compounds having a detergent action and the brightening agent. The mixtures containing the detergent and the optical brightener are obtained by simply mixing and/or grinding the ingredients together; in this connection it may be advantageous to use one or the other ingredient in the dissolved or molten state to facilitate dispersion.

In general a small addition of the optical brightener to the detergent will suffice; there may be used, for example, an amount of 0.1 to 2% referred to the weight of detergent used; also smaller amounts, for example 0.01% may be added. It is also possible to use mixtures with other known brightening agents.

The detergents are used in the usual washing methods; in this way the materials to be cleaned may be washed and at the same time brightened.

Materials to be optically brightened may be, for example:

(A) Textile materials which may be in any desired form, for example in the form of fibres, filaments, yarns, woven or knitted fabrics or felt, as well as any product manufactured therefrom; such textile materials may consist of natural materials of animal origin, such as wool or silk, or of vegetable origin, such as cellulose materials of cotton, hemp, flax, linen, jute, ramie; or of semi-synthetic materials such as regenerated cellulose, for example rayon, viscoses, including spun rayon; furthermore of cellulose esters such as cellulose butyrate and acetyl-cellulose, also of synthetic materials accessible by polymerization, for example polyacrylonitrile, polyvinyl chloride, polyvinylidene chloride, polyolefins such as polyethylene and especially polypropylene, or of synthetic materials that are accessible by polycondensation, more especially polyesters and polyamides.

(B) Other fibrous materials not being textile materials; they may be of animal origin such as feathers, hairs and pelts or hides and leathers made from the latter by natural or chemical tanning, as well as manufactured goods made threefrom; also materials of vegetable origin such as straw, wood, woodpulp or fibrous materials consisting of densified fibrous materials, more especially paper, cardboard or hardboard, as well as finished products made from the latter.

(C) Synthetic materials of diverse constitution in the form of powders, films, lacquers, resins or mouldings, consisting for example of acetylcellulose, nitrocellulose, vinyl acetate, polystyrene, polyvinyl chloride, copolymers of vinyl chloride and vinylidene chloride, alkyd resin lacquers, polyolefines, polyacrylonitrile, polyamides, polyesters, epoxy resins, formaldehyde condensation products with phenol, urea or melamine.

When the new brighteners are used in conjunction with other improving agents, for example by one of the methods described above under (a) to (d), it is of advantage to perform such a combined treatment with the aid of a suitable preparation. These stable preparations contain at least one oxadiazolyl-thiophene compound of the constitution defined above and at least one dispersing agent, detergent, dyestuff, pigment, dressing agent or finely dispersed carrier pigment.

Unless otherwise indicated, parts and percentages in the following examples are by weight.

*Example 1*

37.2 parts of thiophene-2:5-dicarboxylic acid monomethyl ester (prepared according to Example VIIa of U.S. patent specification 2,680,731) are dissolved in 250 parts by volume of chlorobenzene and 30 parts of thionyl chloride and heated with stirring within one hour to 115° C.; the whole is then stirred on for one hour at this temperature, during which thiophene-2:5-dicarboxylic acid monomethyl ester chloride is formed and a complete solution is obtained. The excess of thionyl chloride is removed by passing through a current of dry air or by distillation under vacuum, and at 20° C. 33.2 parts of p-methoxy benzoic acid hydrazide and 250 parts by volume of chlorobenzene are added. The reaction mixture is heated to the boil within 1 to 1½ hours while being vigorously stirred and then refluxed for 6 to 12 hours, to yield the hydrazide of the formula

(19)
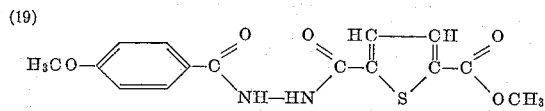

as a colorless substance. When hydrochloric acid is no longer being evolved, 60 parts of thionyl chloride are dropped in within 30 minutes and the reaction mixture is refluxed for another 4 to 8 hours with exclusion of air. The excess thionyl chloride and the bulk of the chlorobenzene are distilled off the resulting clear, yellow reaction solution. While the solution is then allowed to cool to about 10° C., 250 parts by volume of methanol are added. The crystalline precipitate of 5-[5'-(4'')-methoxyphenyl - (1'')-1':3':4'-oxadiazolyl-(2')]-thiophene-2-carboxylic acid methyl ester of the formula

(20) 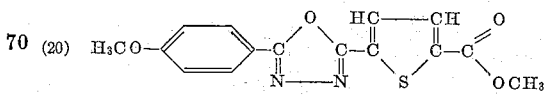

is suctioned off, washed with 250 parts by volume of methanol and dried. Yield: about 43.4 parts (=68.7% of the theoretical) of a pale-yellow, crystalline powder which, after four crystallizations from dioxane with the aid of active carbon and bleaching earth, forms a colorless, finely crystalline powder melting at 178.5 to 179° C.

*Analysis.*—$C_{15}H_{12}O_4N_2S$ (molecular weight 316.34):

|  | C | H | N |
|---|---|---|---|
| Calculated_____percent__ | 56.95 | 3.82 | 8.86 |
| Found_____do____ | 57.12 | 4.04 | 8.93 |

The following oxadiazolyl-thiophene compounds can be manufactured in an analogous manner:

5 - [5'-(4''')-biphenyl-(4'')-1':3':4'-oxadiazolyl-(2')]-thiophene-2-carboxylic acid methyl ester of the formula

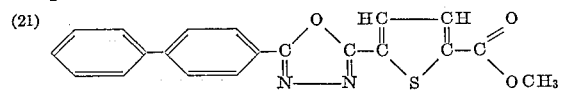

in a yield of 82.3% of the theoretical. After three recrystallizations from dioxane with the aid of active carbon the compounds form small colorless, slightly felted needles melting at 211.5 to 212° C.

*Analysis.*—$C_{20}H_{14}O_3N_2S$ (molecular weight 362.41):

|  | C | H | N |
|---|---|---|---|
| Calculated_____percent__ | 66.28 | 3.89 | 7.73 |
| Found_____do____ | 66.17 | 4.00 | 7.56 |

5 - [5'-(3'')-methoxy-naphthyl-(2'')-1':3':4'-oxadiazolyl-(2')]-thiophene-2-carboxylic acid methyl ester of the formula

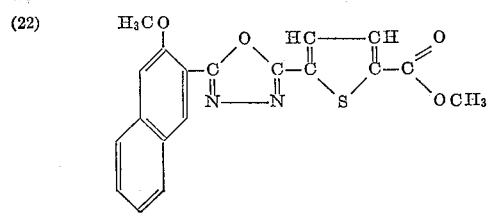

in a yield of 81.0% of the theoretical. After three recrystallizations from tetrachloroethylene with the aid of bleaching earth, there are obtained light-yellow, shiny crystals melting at 177 to 177.5° C.

*Analysis.*—$C_{19}H_{14}O_4N_2S$ (molecular weight 366.40):

|  | C | H | N |
|---|---|---|---|
| Calculated_____percent__ | 62.28 | 3.85 | 7.65 |
| Found_____do____ | 61.82 | 3.72 | 7.60 |

Example 2

113.5 parts of 5 - [5' - (4'') - methoxy-phenyl-(1'')-1':3':4' - oxadiazolyl - (2')]-thiophene-2-carboxylic acid methyl ester of the Formula 20 are dissolved with heating in 1000 parts by volume of dioxane; 125 parts of hydrazine hydrate are added, and the whole is refluxed with stirring for 15 hours, whereupon 5-[5'-(4'')-methoxy-phenyl-(1'') - 1':3':4' - oxadiazolyl-(2')]-thiophene-2-carboxylic acid hydraxide of the formula

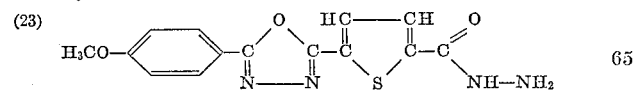

settles out in the form of yellow crystals. The reaction mixture is diluted with 500 parts by volume of methanol, cooled to about 5° C., suction-filtered, and the filter cake is washed with 500 parts by volume of methanol cooled at 5° C. After drying, there are obtained about 108 parts (=95.2% of the theoretical yield) of a yellow powder melting at 241 to 242° C. After several recrystallisations from dioxane, a light-yellow, finely crystalline powder is obtained which melts at 241 to 242° C.

*Analysis.*—$C_{14}H_{12}O_3N_4S$ (molecular weight 316.34):

|  | C | H | N |
|---|---|---|---|
| Calculated_____percent__ | 53.16 | 3.82 | 17.71 |
| Found_____do____ | 53.17 | 4.11 | 17.12 |

Example 3

100 parts of a polyamide fabric, for example spun nylon, are immersed at 60° C. in a both consisting of 4000 parts of water
4 parts of a dispersant (adduct from 35 mols of ethylene oxide with 1 mol of octadecyl alcohol) and
0.5 part of the oxadiazolyl-thiophene compound of the Formula 20.

The bath is then raised to the boil within 20 minutes, and the fabric is treated at the boil for 30 minutes, then rinsed and dried.

The polyamide fabric treated in this manner has a substantially higher white content than the untreated fabric.

Similar results are obtained when the compound of the Formula 20 is replaced by the oxadiazolyl-thiophene compound of the Formula 21.

What is claimed is:
1. An oxadiazolyl-thiophene compound of the formula

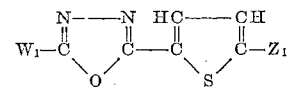

where $W_1$ is a member selected from the group consisting of (lower)alkoxy-phenyl, biphenylyl, naphthyl and (lower)alkoxy-naphthyl and $Z_1$ is a member selected from the group consisting of carboxy, carbo(lower)alkoxy and carbohydrazide.

2. The oxadiazolyl-thiophene compound of the formula

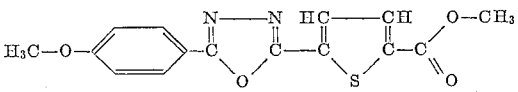

3. The oxadiazolyl-thiophene compound of the formula

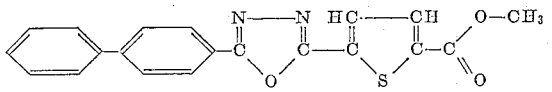

4. The oxadiazolyl-thiophenec ompound of the formula

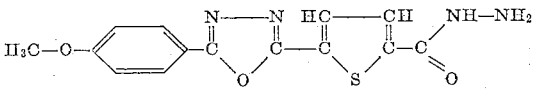

5. The oxadiazolyl-thiophene compound of the formula

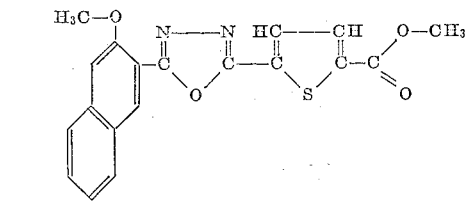

No references cited.

NICHOLAS S. RIZZO, *Primary Examiner.*